(12) United States Patent
Akamatsu

(10) Patent No.: US 11,951,581 B2
(45) Date of Patent: Apr. 9, 2024

(54) CLAMP SYSTEM EQUIPPED WITH FUNCTION FOR DETECTING BEHAVIOR OF OBJECT TO BE CLAMPED

(71) Applicant: KOSMEK LTD., Kobe (JP)

(72) Inventor: Hiroshi Akamatsu, Kobe (JP)

(73) Assignee: KOSMEK LTD. (JP)

( * ) Notice: Subject to any disclaimer, the term of this patent is extended or adjusted under 35 U.S.C. 154(b) by 746 days.

(21) Appl. No.: 17/263,234

(22) PCT Filed: Jul. 25, 2019

(86) PCT No.: PCT/JP2019/029185
§ 371 (c)(1),
(2) Date: Jan. 26, 2021

(87) PCT Pub. No.: WO2020/026933
PCT Pub. Date: Feb. 6, 2020

(65) Prior Publication Data
US 2022/0048148 A1   Feb. 17, 2022

(30) Foreign Application Priority Data

Aug. 2, 2018  (JP) .................................. 2018-145685

(51) Int. Cl.
*H01H 47/00* (2006.01)
*B23Q 3/06* (2006.01)
(Continued)

(52) U.S. Cl.
CPC ............. *B23Q 3/06* (2013.01); *B23Q 17/003* (2013.01); *B23Q 17/2428* (2013.01)

(58) Field of Classification Search
None
See application file for complete search history.

(56) References Cited

U.S. PATENT DOCUMENTS

| 6,758,467 B2 * | 7/2004 | Kitaura | ................... B25B 5/064 269/20 |
| 10,186,363 B2 * | 1/2019 | Matsuo | ................... H01F 27/30 |

(Continued)

FOREIGN PATENT DOCUMENTS

| JP | 2-19440 | 2/1988 |
| JP | 6-71005 | 10/1994 |

(Continued)

OTHER PUBLICATIONS

International Search Report mailed Sep. 3, 2019 in connection with International Application No. PCT/JP2019/029185, 2 pages.

(Continued)

*Primary Examiner* — Stephen W Jackson
(74) *Attorney, Agent, or Firm* — Merek, Blackmon & Voorhees, LLC

(57) ABSTRACT

Provided is a clamp system with enhanced functionality achieved by detecting the behavior of an object to be clamped, using a stroke-end position detector that has been used for switching stroke operations. A clamp device 1 has an output member 12 which executes a stroke movement causing a change in the distance by which a coil 15 is inserted into a hole 14 having a bottom. A converter 23 outputs a measurement value of the inductance of the coil 15. The inductance of the coil 15 when a work W has been clamped by the output member 12 is stored in a work clamp point memory 22e, and a clamp area indicating a variation range permitted with respect to a work clamp point is set in a clamp area memory. During processing of the work, a control unit 2 measures the inductance of the coil 15, determines whether the work clamp point is within the range of the clamp area, and, if the range is exceeded, issues a signal indicating an emergency stop.

3 Claims, 3 Drawing Sheets

(51) Int. Cl.
    *B23Q 17/00*          (2006.01)
    *B23Q 17/24*          (2006.01)

(56) References Cited

U.S. PATENT DOCUMENTS

| | | | |
|---|---|---|---|
| 10,967,485 | B2* | 4/2021 | Terasaki .................. B23Q 3/06 |
| 11,426,901 | B2* | 8/2022 | Akamatsu ............... B29C 45/64 |
| 2006/0175852 | A1 | 8/2006 | Sotome et al. |
| 2006/0261969 | A1 | 11/2006 | Takaku |
| 2018/0036854 | A1 | 2/2018 | Takano |

FOREIGN PATENT DOCUMENTS

| | | |
|---|---|---|
| JP | 6-74209 | 10/1994 |
| JP | 3280345 | 2/2002 |
| JP | 2003-156304 | 5/2003 |
| JP | 2006-218580 | 8/2006 |
| JP | 2006-224261 | 8/2006 |
| JP | 2006-317387 | 11/2006 |
| JP | 2006-320979 | 11/2006 |
| WO | WO2016139726 | 9/2016 |

OTHER PUBLICATIONS

Translation of International Preliminary Report on Patentability issued in connection with International Application No. PCT/JP2019/029185, 6 pages.

\* cited by examiner

CLAMP SYSTEM EQUIPPED WITH FUNCTION FOR DETECTING BEHAVIOR OF OBJECT TO BE CLAMPED

FIELD OF THE INVENTION

The present invention relates to a clamp system equipped with function for detecting behavior of object to be clamped.

A machining center is provided with a clamp device for fixing a work to be clamped to a reference member such as a table or a pallet. As a clamp device, for example, a clamp device using a fluid pressure cylinder as disclosed in Patent Literature 1 is known. The work is grasped and released by a stroke movement of a piston of the fluid pressure cylinder. The clamp device driven by fluid pressure is equipped with a position detector to detect a stroke end. When the piston moves to the stroke end, the position of the stroke end is detected to stop supplying the pressure fluid. In the position detector of Patent Literature 1, a magnet is placed in the piston, and magnetic sensors for detecting magnetic force are placed in both ends of the stroke of the piston on the outside of the cylinder tube, respectively. When the piston reaches the stroke end, the magnetic sensor placed in the place detects the magnetic force of the magnet.

Further, according to a position detector in Patent Literature 2, a clamp device is disclosed in which a piston made of a magnetic material is made hollow, a coil is inserted into the hollow, and a clamping device is arranged so that the overlapping distance with the coil changes according to the stroke movement of the piston. The piston position is detected by connecting a pulse from a fixed frequency pulse oscillator to the coil and then detecting the change in overlapping distance as a change in inductance. Compared with the technique of Patent Literature 1, there is no need to attach a magnetic sensor requiring an attachment place to a cylinder tube, and no attachment space is required to incorporate a magnet.

Some clamp devices are configured so as to detect the position of only one of the stroke ends. Such a device uses pressure fluid in moving toward one of the stroke ends, and utilizes elastic force of a spring in returning to the other stroke end.

PRIOR ART

Patent Literature

Patent literature 1: Japanese Patent No. 3280345
Patent literature 2: Japanese Patent Laid Open Publication No. 2003-156304

DISCLOSURE OF THE INVENTION

Problems to be Solved by the Invention

The clamp device grasps the work on one side of the stroke ends and releases the work on the other side thereof. According to such a conventional technique, the position detector detects that the piston has reached the stroke end to be used to switch the stroke operation. In Patent Literature 2, the position detector detects an inductance change. This inductance change is converted into time or voltage and then compared with a predetermined threshold value, and when the predetermined position is reached, the switch output is generated assuming that the stroke end has been reached.

The present invention provides a clamp system having a further enhanced function by detecting a behavior of an object to be clamped by using a stroke end position detector that has been used to detect that a piston has reached a predetermined position.

Means to Solve the Problem

A clamp system equipped with a function for detecting a behavior of an object to be clamped according to the present invention, which is provided in a machining center for processing a clamped object clamped on a reference member through an output member, includes a clamp device having the output member made of magnetic material which executes a stroke movement causing a change in an overlapping distance between the output member and a coil, a converter for outputting a measurement value of an inductance of the coil, a memory for setting a clamp area indicating a variation range permitted with respect to a position of the outputting member which is data representing the measurement value of the inductance of the coil when the object to be clamped is clamped on the output member in a process of moving the output member from an unclamped state to a clamped state with respect to the clamped object placed on the reference member as the object to be processed, and a control unit reporting an execution of clamping to the machining center after setting the positions of the clamp area and the output member in the memory as well as measuring the inductance of the coil during processing of the clamped object by the machining center, determining whether it is within a range of the clamp area stored in the memory, and issuing an abnormality to the machining center when the range is exceeded.

Effects of Invention

According to the present invention, it is possible to perform abnormality monitoring with respect to variations during processing for the clamp point by using the position detector for the stroke end, which has been used to detect that the piston has reached a predetermined position. In addition, a position to be clamped varies depending on the clamped object, but in the process of clamping, the position to be clamped is acquired from the value actually measured on the clamp system side, and processing of the object to be processed by the machining center starts. Even during processing, it is continuously measured to determine whether it is within the range of the clamp area, and when it exceeds the range, an abnormality is issued to the machining center. Therefore, the position to be clamped of the object to be clamped can be set individually.

BRIEF DESCRIPTION OF THE DRAWINGS

FIGS. 2A to 2B show a clamp device of a type having a swing arm, and FIGS. 2C to 2D show a clamp device of a type having a link mechanism.

FIG. 3A shows an initial setting program of a control unit 2, FIG. 3B shows a processing program in a work machining state, and FIG. 3C shows an enlarged screen of a display unit.

PREFERRED EMBODIMENT OF THE INVENTION

Figure 1:
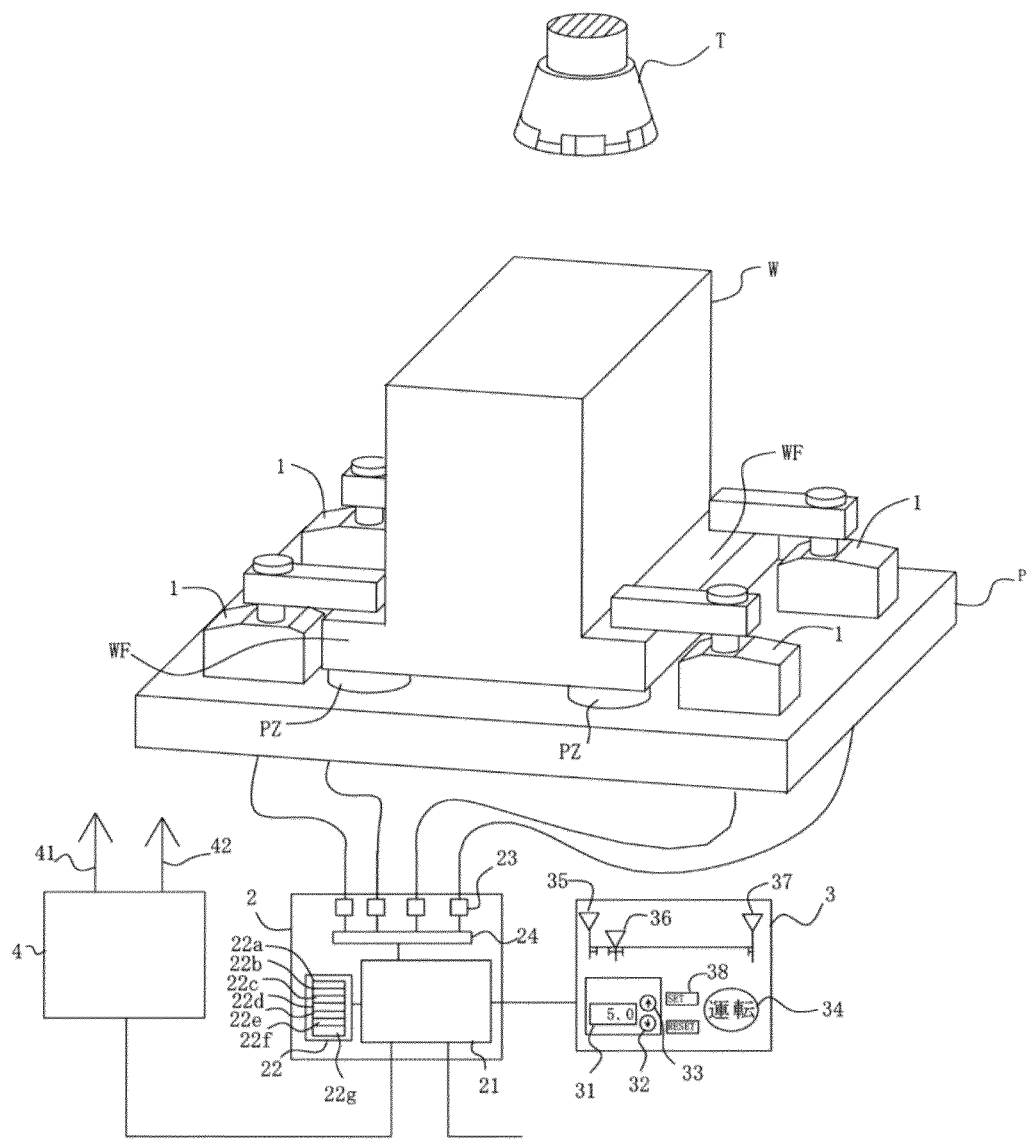
FIG. 1 shows a machining center and a clamp system equipped with a function for detecting a behavior of an object to be clamped.

FIG. 1 shows a machining center and a clamp system equipped with a function for detecting a behavior of a work W which is an object to be clamped. The clamp system having the function for detecting the behavior of the work W includes a clamp device 1 (four units in the figure), a control unit 2, a display unit 3 having an input/output function, and a hydraulic unit 4. The clamp device 1 is installed on a pallet P to fix the work W on a pedestal PZ provided on the pallet P. The work W is processed by a cutting tool T. The illustrated clamp device 1 is a type equipped with a swing arm. In this type of clamp device 1, in the initial stage when an output member descends, the swing arm of an output member rotates and then linearly descends to press a flange portion WF of the work W against the pedestal PZ. The clamp system further includes a hydraulic unit 4 provided with two systems, a lock side system 41 for sending pressure oil to the clamp device 1 at the time of clamping and a release side system 42 for sending pressure oil at the time of unclamping, and is controlled by the control unit 2. The control unit 2 is connected to a controller (not shown) of the machining center.

Figure 2A:
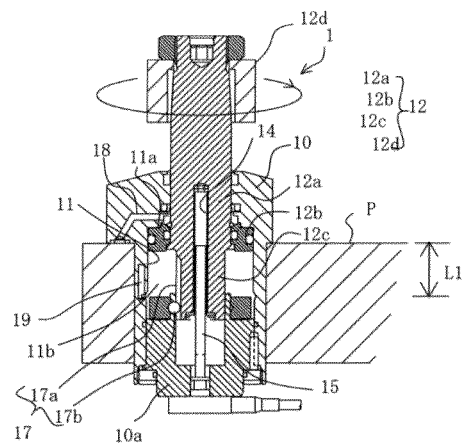
FIGS. 2A to 2D show an example of a clamp device used in the clamp system.
Figure 2B:
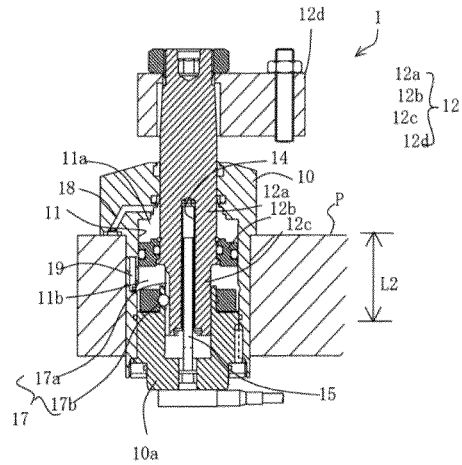
Figure 2C:
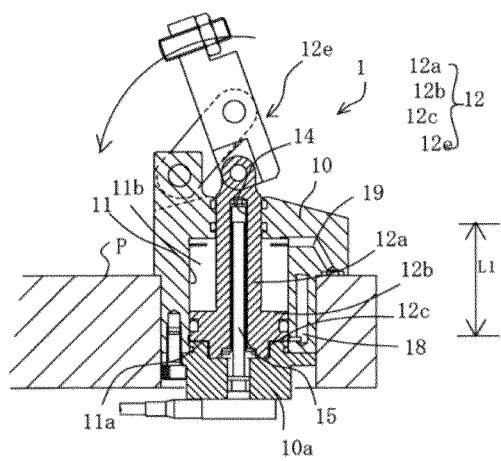
Figure 2D:
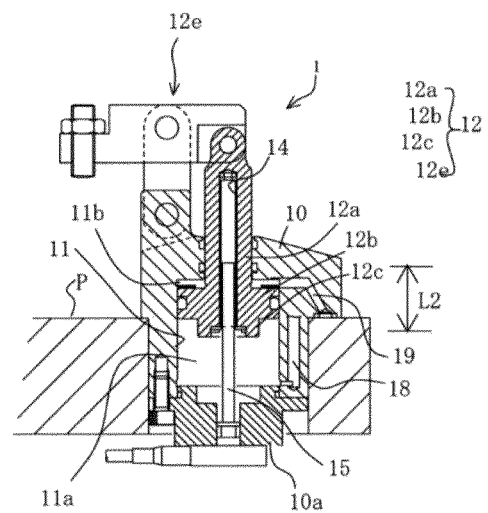

FIGS. 2A to 2D show an example of a clamp device 1 that is used in the clamp system. FIGS. 2A to 2B show a type of clamp device 1 equipped with a swing arm, which is shown in FIG. 1. In addition, FIGS. 2C to 2D show a type of clamp device 1 equipped with a link mechanism.

In the clamp device 1 shown in FIGS. 2A to 2B, a cylinder hole 11 is formed inside a housing 10, and an output member 12 whose axial direction is a vertical direction in these figures is inserted into the cylinder hole 11. FIG. 2A shows an unclamped state and FIG. 2B shows a clamped state. The output member 12 has an arm 12d, and a rod body 12a, a piston portion 12b having a diameter larger than that of the rod body 12a and a lower rod 12c, which are formed in order from the upper side in the axial direction. The housing 10 has a passage 18 for supplying pressure fluid (i.e., a fluid under pressure) to a cylinder hole 11a which is located above the piston portion 12b and a passage 19 for supplying pressure fluid to a cylinder hole 11b which is located below the piston portion 12b drilled, respectively.

The lower rod 12c is provided with a swivel mechanism 17 that rotates the arm 12d. The swivel mechanism 17 includes a guide groove 17a and a ball 17b. The guide groove 17a is composed of a spiral turning groove and a rectilinear groove that follows the spiral groove (only the rectilinear groove is shown in the figure), and the ball 17b whose relative position is fixed to the housing 10 rolls in the guide groove 17a to rotate the output member 12.

The output member 12 is provided with a bottomed hole 14 which is opened in a hollow shape toward the lower side in the axial direction, and the coil 15 is inserted therein. The coil 15 is installed on a lower bottom wall 10a of the cylinder hole 11, and is inserted in the bottomed hole 14 with a gap in the radial direction perpendicular to the axial direction. In accordance with a stroke movement of the output member 12, a distance that the coil 15 is inserted into the bottomed hole 14 in the length direction of the coil 15 (or a distance overlapping with the output member 12) varies within a range from a length L1 (FIG. 2A) to a length L2 (FIG. 2B). The output member 12 is made of a magnetic material, and magnetic resistance of magnetic circuit through which magnetic flux generated by the coil 15 passes is changed by changing the insertion distance.

In the clamp device 1 shown in FIGS. 2C to 2D, the components having the same functions as the components of the clamp device 1 shown in FIGS. 2A to 2B are denoted by the same reference numerals. The clamp device 1 of FIGS. 2C to 2D is different in that the swivel mechanism 17 described above is not provided and the output member 12 is provided with a link mechanism 12e instead of the arm 12d. Although FIG. 2C shows a cross section in an unclamped state and FIG. 2D shows a cross section in a clamped state, it is also different in that the rod main body 12a descends in the unclamped state and rises in the clamped state. That is, the insertion distance is reversed in each state.

In any of the clamp devices 1, the magnetic resistance of the magnetic circuit through which the magnetic flux generated by the coil 15 passes is determined by the insertion distance, and appears as the inductance of the coil 15. The inductance can be electrically measured by a known method. For example, the inductance can be obtained by connecting a resistor and a capacitor in series to the coil 15, comparing the voltage of the capacitor with a threshold voltage in the process of discharging the charge accumulated in the capacitor through the coil 15 and the resistor, and measuring the time interval from the start of discharge to the time when the voltage falls below the threshold voltage.

Returning to FIG. 1, the control unit 2 has a processing unit 21, a converter 23 that obtains the inductance of the coil 15 and outputs as information indicating the position of the output member 12, a multiplexer 24 that connects the processing unit 21 and the converter 23, and a memory 22. For the display unit 3, it is desirable to use a display unit having an input/output function such as an LCD touch panel, since various types of key tops can be displayed.

Various key tops are displayed on the display unit 3. Keys 32, 33 are numerical value input keys. Each time the key 32 is pressed, the numerical value displayed in a display window 31 increases by a predetermined number of units, and each time the key 33 is pressed, it decreases by a predetermined number of units. A key 34 is a key for selecting an operation mode. When the key 34 is pressed, the machining center enters the work processing state. Keys 35, 36, 37 are keys for determining clamp points (empty clamp point, work clamp point, unclamp point), which will be described with reference to FIG. 3.

Figure 3A:
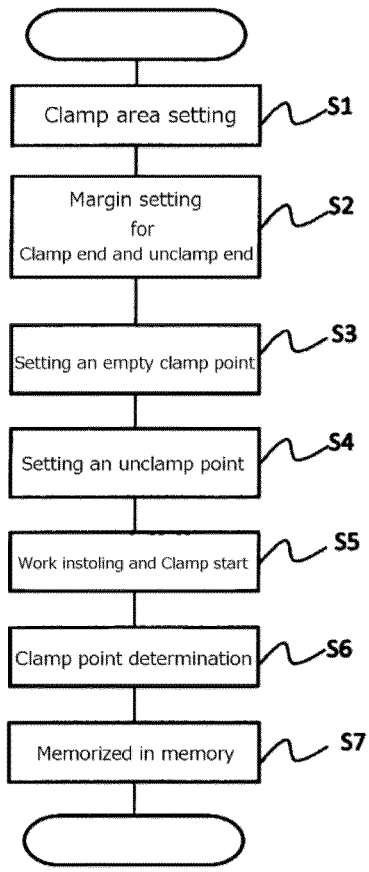
FIGS. 3A to 3C are views explaining the processing of the control unit.
Figure 3B:
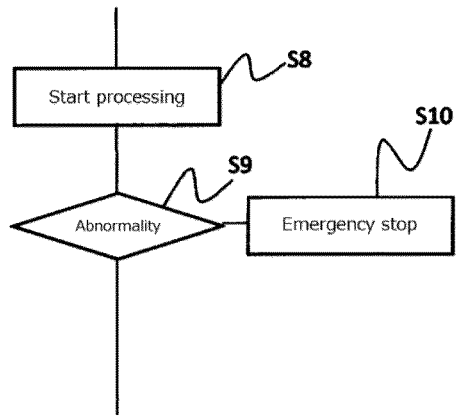
Figure 3C:
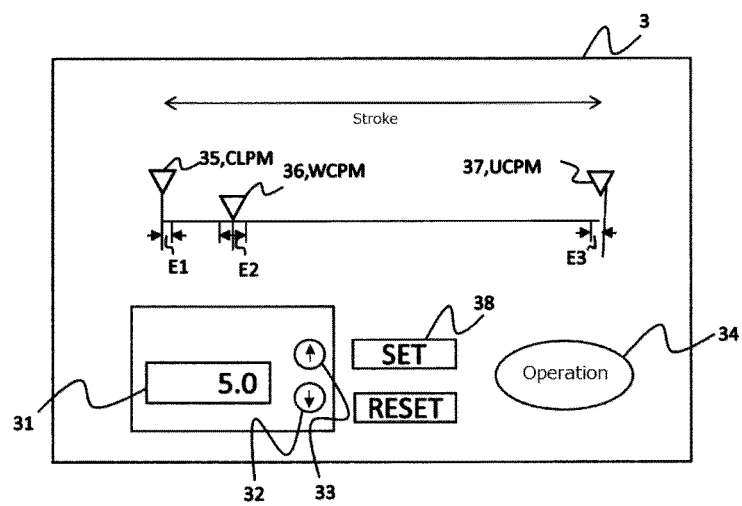

FIGS. 3A to 3C are a view for explaining the processing of the control unit 2. FIG. 3A shows an initial setting program, FIG. 3B shows a processing program in a work processing state, and FIG. 3C shows an enlarged screen of the display unit. The key 35 corresponds to the empty clamp point (called CLPM). The CLPM indicates the position of the output member in the empty clamp state. The key 37 corresponds to an unclamp point (referred to as UPCLM). The UPCLM indicates the position of the output member in the unclamped state. Therefore, the output member strokes between the CLPM and the UPCLM, with the CLPM and the UPCLM being the stroke end, respectively. The key 36 corresponds to a work clamp point (referred to as WCPM). The WCPM indicates the position of the output member that presses the work W (specifically, the flange portion WF of the work W). Predetermined margins can be set in the UPCLM and the CLPM, respectively. When the output member 12 reaches the range set by the margin setting, it is considered that the target UPCLM and CLPM have been reached.

In FIG. 3A, the clamp device 1 is initialized. First, in step S1, a clamp area is set. This process is a clamp area setting process for the WCPM. The clamp area is a permissible range of variation for determining an abnormality when the output member 12 moves beyond this range during processing of the work W. In the display of the display unit 3 shown in FIG. 3C, the key 36 corresponding to the WCPM changes color and prompts the user to set the clamp area for WCPM. The position of the key 36 is a default position. Use the keys 32, 33 to enter numerical values in the display window 31.

Set a clamp area E2 above and below the WCPM, and press the key 38 when the numerical value is determined. The upper and lower clamp area E2 are set within a range of, for example, 0 to 5 mm.

Next, in step S2, margin setting for UPCLM and CLPM is performed. The key 37 and the key 35 corresponding to UPCLM and CLPM change colors in order to prompt input. Use the keys 32, 33 to enter the numerical values on the display window. Each of margin ranges E1, E3 is set, for example, in a range of 0 to 1 mm, starting from each of the UPCLM and the CLPM. When the numerical value is determined, press the key 38.

In step S3, an empty clamp point is determined in the empty clamp state. The key 35 changes color. When the key 33 is pressed while the work W is not set on the pallet P, the output member moves to the clamped state. When the key 35 is pressed at a position that should be set as an empty clamp point, the inductance of the coil at that position is taken into the control unit 2 as information indicating the position of the output member 12 to be determined as the position of the output member in the empty clamp state.

In step S4, an unclamp point is determined in the unclamped state. The key 37 changes color. When the key 32 is pressed, the output member moves to the unclamped state. When the key 37 is pressed at the position to be set as the unclamp point, the inductance of the coil at that position is taken into the control unit 2 as information indicating the position of the output member 12 to be determined as the position of the output member in the empty clamp state.

The work W is mounted on the pallet P before the processing of step S5. In step S5, the key 36 changes color. When the key 33 is pressed, the output member moves to the clamped state. When the key 36 is pressed at the position where the clamp device 1 clamps the work W, this position is determined as the work clamp point in the clamped state. The thickness of the flange portion WF, which is the gripped portion of the work W, may vary depending on the work W, but conventionally, this is allowed as a margin in the clamped state. Specifically, the threshold value for obtaining switch output has a margin. However, according to this embodiment, the thickness of the flange portion WF of the work W can be individually set.

In step S6, a clamp area, a margin, an empty clamp point, a clamp point, and an unclamp point are set to a clamp area memory 22a, margin memories 22b, 22c, an empty clamp point memory 22d, a clamp point memory 22e, and an unclamp point memory 22f of the memory 22, respectively, and then, the initial setting is completed.

In FIG. 3B, when the key 34 is pressed and the "operation mode" is selected in step S8, the control unit 2 reports to the controller of the machining center that clamping has been performed, and the machining center becomes a work machining state with the cutting tool T. In step S9, whether the position of the output member is within the set clamp area E2 or not is constantly monitored for the inductance of the coil. When the monitored inductance exceeds the range of the clamp area E2 as the information indicating the position of the output member, the controller of the machining center is notified of the abnormal state in step S10. On the basis of this report, the controller of the machining center starts to deal with the emergency (for example, emergency stop).

In the above embodiment, when an area of a log memory 22g is secured in the memory 22 and the information obtained by the constant monitoring in step S9 is stored as the log data in the log memory 22g, even if an emergency stop does not occur, when a defect is found in the machined work W, data analysis by the log data of the clamp device 1 at the time of processing becomes possible. For example, when the clamp point changes for one of the four clamp devices 1 on the pallet P, it can be inferred that the local pressure by the cutting tool T has been applied, which can be used as a countermeasure.

According to the present embodiment, the position detector at the stroke end, which has been used for switching the stroke operation, can be used to perform abnormality monitoring for variations in the clamp point during processing. Further, even when the thickness of the gripped portion varies for each work, the clamp points can be set individually, so that fine-grained abnormality detection can be performed.

DESCRIPTION OF SYMBOLS 1 clamp device
2 control unit
3 display unit
4 hydraulic unit
10 housing
10a lower bottom wall
11 cylinder hole
12 output member
12a rod main body
12b piston portion
12c lower rod
12d arm
12e link mechanism
14 bottomed hole
15 coil
17 swivel mechanism
17a guide groove
17b ball
21 processing unit
22 memory
23 converter
24 multiplexer
31 display window
32, 33, 34, 35, 36, 37, 38 key
E1, E3 margin range
E2 clamp area
P pallet
PZ pedestal
T cutting toll
W work
WF flange portion

The invention claimed is:

1. A clamp system equipped with function for detecting behavior of an object to be clamped, said clamp system being provided in a machining center for processing a clamped object clamped on a reference member through an output member, comprising:

a clamp device in which an overlapping distance between a coil and the output member made of a magnetic material is changed by stroke movement of the output member;

a converter for outputting a measured value of an inductance of the coil;

a memory in which data indicating the measured value of the inductance of the coil when the object to be clamped is clamped on the output member in a process of moving the output member from an unclamped state to a clamped state with respect to the clamped object placed on the reference member as the object to be processed is set as a position of the output member and a clamp area indicating a variation range allowed for the position the output member is set; and a control unit for reporting an execution of clamping to the machining center after setting the positions of the clamp area and the output member in the memory, measuring the inductance of the coil during processing of the clamped object by the machining center, determining whether the output member it is within a range of the clamp area stored in the memory, and issuing an abnormality to the machining center when the range is exceeded.

2. The clamp system equipped with function for detecting behavior of an object to be clamped according to claim 1, wherein the coil is configured to be inserted into a bottomed hole provided in the output member.

3. The clamp system equipped with function for detecting behavior of an object to be clamped according to claim 1, further comprising:

a log memory for storing the measured value of the inductance of the coil during processing as log data.

\* \* \* \* \*